United States Patent [19]

Imamura et al.

[11] Patent Number: 4,746,835
[45] Date of Patent: May 24, 1988

[54] FLUORESCENT LAMP DEVICE HAVING OVAL CROSS SECTIONAL TUBES

[75] Inventors: Hitoshi Imamura, Yokohama; Akihiro Inoue, Chigasaki; Hidenori Ito, Yokosuka, all of Japan

[73] Assignee: Kabushiki Kaisha Toshiba, Kawasaki, Japan

[21] Appl. No.: 912,126

[22] Filed: Sep. 26, 1986

[30] Foreign Application Priority Data

Sep. 28, 1985 [JP] Japan .................. 60-215503

[51] Int. Cl.$^4$ .................. H01J 61/30; H01J 61/88
[52] U.S. Cl. .................. 313/493; 313/634
[58] Field of Search .................. 313/493, 611, 634

[56] References Cited

U.S. PATENT DOCUMENTS

| 3,899,712 | 8/1975 | Witting . |
| 3,953,761 | 4/1976 | Giudice . |
| 4,260,931 | 4/1981 | Wesselink et al. .................. 313/493 |
| 4,335,331 | 6/1982 | Watanabe et al. .................. 315/334 |
| 4,524,301 | 6/1985 | Cohen et al. .................. 313/634 X |

FOREIGN PATENT DOCUMENTS

| 582517 | 8/1933 | Fed. Rep. of Germany . |
| 2942846 | 5/1980 | Fed. Rep. of Germany . |
| 3311457 | 10/1983 | Fed. Rep. of Germany . |
| 60-172158 | 9/1985 | Japan . |
| 929618 | 6/1963 | United Kingdom . |
| 966077 | 8/1964 | United Kingdom . |
| 2071407 | 9/1981 | United Kingdom . |

Primary Examiner—David K. Moore
Assistant Examiner—Sandra L. O'Shea
Attorney, Agent, or Firm—Cushman, Darby & Cushman

[57] ABSTRACT

A fluorescent lamp device includes a main body having a base, and a fluorescent lamp supported by the main body and electrically connected to the base. The lamp has a plurality of U-shaped glass tubes which define a zigzagging discharge channel. Each glass tube is provided with a pair of straight portions, each of which has a flat cross section.

10 Claims, 5 Drawing Sheets

FLUORESCENT LAMP DEVICE HAVING OVAL CROSS SECTIONAL TUBES

BACKGROUND OF THE INVENTION

This invention relates to a fluorescent lamp device which uses curved fluorescent lamps.

A fluorescent lamp device has recently been developed which has an outer case accommodating some fluorescent lamps bent in a U-shape, a W-shape or a saddle-shape, as well as operating circuit parts such as a stabilizer, a glow switch starter, a capacitor, etc., and a base for use with an incandescent lamp is attached to the outer case. Interchangeable with an incandescent lamp, this kind of fluorescent lamp device is becoming increasingly popular as an energy-saving light source, and development is now underway to make it smaller in size and greater in output.

The ordinary method for making a lamp more compact is to reduce the diameter of the glass tube constituting the fluorescent lamp and to reduce the curvature of the bent portions of the glass tube. Reducing the curvature is done in order to bring one straight glass tube part as close to another as possible, or even in contact with each other, in some cases.

In order to give the lamp a greater output, it is necessary to elongate its discharge channel as much as possible within the limited space. Making the glass tube smaller in diameter as well as reducing the curvature of the bent portions also makes the lamp compact.

However, if the glass tube is made smaller in diameter, its wall temperature will rise higher, even if the inut to the fluorescent lamp is the same. In other words, if the glass tube is reduced in diameter, the surface area of the glass tube, which determines the heat radiation efficiency of the lamp, becomes smaller. Therefore, the temperature of the glass tube wall rises, even if the input governing the lamp's calorific value is the same.

Also, since the curvature of the bent portions is reduced, the glass tubes can be placed closer to one another. However, this means that glass tubes which must radiate heat effectively, will be located close to one another glass. These conditions will lower the heat discharge efficiencies of the individual glass tubes, and excessive heat will be generated.

The temperature rise in the glass tube walls induces yet another problem: the fluorescent substance applied to the internal surface of the glass tubes deteriorates more quickly and the life of the fluorescent lamp is shortened. Further, another problem raised is that the mercury vapor pressure in the fluorescent lamp becomes harder to control due to this temperature rise.

SUMMARY OF THE INVENTION

In view of the above problems, the object of this invention is to provide a fluorescent lamp device which can be made compact and in which the temperature rise of the glass tubes can be kept low.

In order to attain this object, a fluroescent lamp device according to one embodiment of this invention includes a plurality of oval shaped glass tubes. Each oval shaped glass tube has a major axis along a across section of the tube which is parallel to the two flat perimeters, of the oval shape. These glass tubes are bent in a U shape, thereby causing two straight portions and a curved portions. If the major axis of each of the two straight portions of any given U shaped tube is extended, a single line is formed.

Multiple tubes are arranged concentrically around the central axis of the main body of the fluorescent lamp so that the major axes of the straight portions form concentric arrangement. The open ends of the straight portions of each tube are attached to the main body.

In this and all of the embodiments, each of the multiple glass tubes are conntected with a connecting member so that the straight portion of one tube is connected to the straight portion of another tube. This results in a discharge chamber which is continuous and has multiple straight portions. This configuration allows for a compact device in which the temperature of the glass can be kept low.

In another embodiment, the major axis of each straight portion of the U shaped oval tube, when extended, intersect to form a V. Multiple tubes with this configuration are arranged so that the major axis of each straight portion intersects at the central axis of the main body. This configuration also allows for a compact device in which the temperature of the glass tubes can be kept low.

In a third configuration, the oval shaped tubes are bent to form a W shape. In this embodiment, the major axis of each straight portion of the W shape, if extended, would form a single line as in the first embodiment. This configuration also allows for a compact device in which the temperature of the glass tubes can be kept low.

BRIEF DESCRIPTION OF THE DRAWINGS

FIGS. 1 through 3 show a fluorescent lamp device according to a first embodiment of this invention, in which FIG. 1 is a partially-broken side view of the device, FIG. 2 is a sectional view taken along the line II—II of FIG. 1, and FIG. 3 is a side view of a glass tube;

FIGS. 4 through 6 show a fluorescent lamp device according to a second embodiment of this invention, in which FIG. 4 is a partially-broken side view of the device, FIG. 5 is a sectional view taken along the line V—V of FIG. 4, and FIG. 6 is a side view of a glass tube;

FIGS. 8 through 15 show a fluorescent lamp device according to a fourth embodiment of this invention, in which FIG. 8 is a partially-broken side view of said device, FIG. 9 is a sectional view taken along the line IX—IX of FIG. 8, FIG. 10 is a perspective view of a fluorescent lamp, FIG. 11 through FIG. 13 are a plan, an elevation and a side view of a glass tube, respectively, FIG. 14 is a sectional view taken along the line XIV—XIV of FIG. 12, and FIG. 15 is a sectional view taken along the line XV—XV of FIG. 12.

DETAILED DESCRIPTION OF THE PREFERRED EMBODIMENTS

The embodiments of this invention will now be described in detail with reference to the accompanying drawings.

Figure 1:
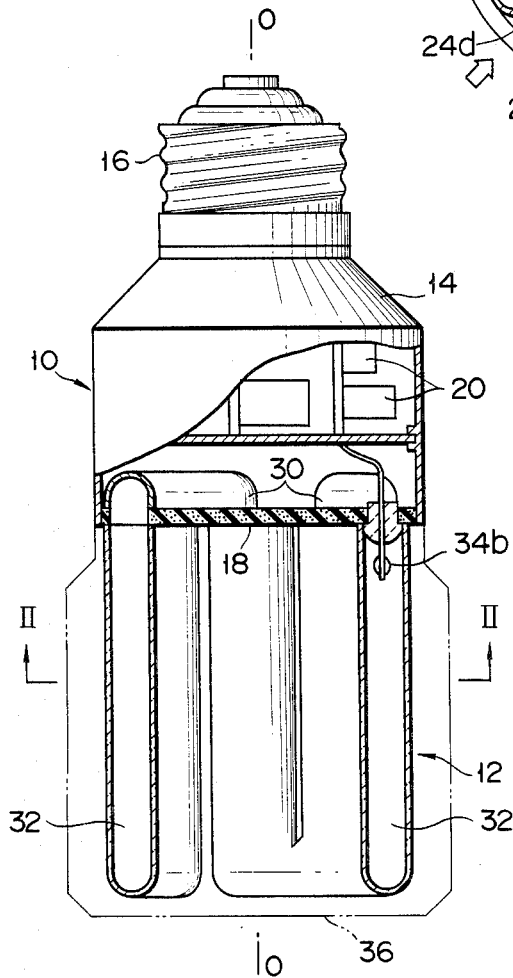

As shown in FIG. 1, a fluorescent lamp device is provided with main body 10 and fluorescent lamp 12 fixed to the main body. Main body 10 has a substantially cylindrical, metallic cover 14, to one end of which is attached a screw-in type base 16. The other open end of cover 14 is blocked by base plate 18 made of ceramics or other insulating materials. Base plate 18 is fixed to cover 14 by an adhesive. Within cover 14 are provided a plurality of electronic operating circuit parts 20, which are electrically connected with base 16 and fluorescent lamp 12.

Figure 2:
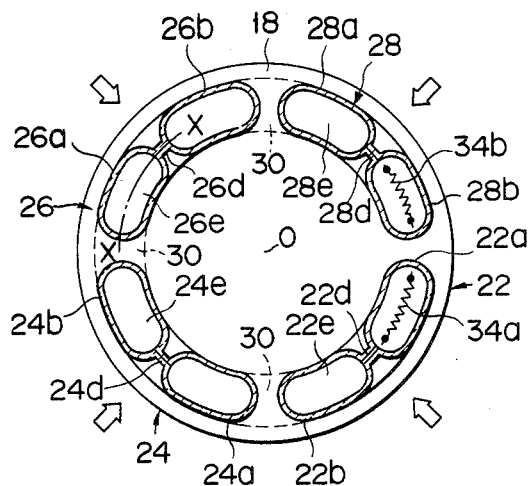
Figure 3:
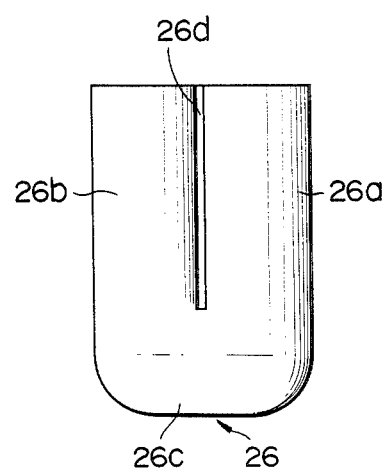

Fluorescent lamp 12 consists of a curved fluorescent lamp having a zigzagging discharge channel. In other words, lamp 12 is constructed by connecting, for example, four U-shaped glass tubes 22, 24, 26 and 28 with one another. Glass tube 26, representative of them all, will be explained. As shown in FIG. 3, glass tube 26 has a pair of straight portions 26a and 26b, and curved portion 26c connecting both ends of these straight portions. Their other ends are opened. Straight portions 26a and 26b are coupled to each other by the connecting wall 26d. As shown in FIG. 2, glass tube 26 has two substantially flat faces, for example, an oval-shaped cross section, with the two flat faces parallel to the major cross sectional axis. A discharge channel 26e defined by this glass tube is shaped accordingly in its cross section. Further, glass tube 26 is constructed so that the major axis X—X in the cross section forms an arc, and straight portions 26a and 26b are coupled to each other so that their axes X—X's in cross section may both be located on a circle. The inner surface of the glass tube 26 is coated with a fluorescent substance (not shown).

Each glass tube having such a construction and shape is formed in one step by pressing a heated and softened thick glass tube between a pair of metal molds.

Each of glass tubes 22 through 28 is fixed at the open ends of its straight portions to base plate 18 of main body 10, and extends therefrom along the central axis of the main body, i.e., the central axis O—O of the fluorescent lamp device. Further, as shown in FIG. 2, glass tubes 22 through 28 are fixed to base plate 18 so that all their major axes X—X's are located on a circle coaxial with central axis O—O of main body 10. This circle is slightly smaller than base plate 18 in diameter.

Three connecting tubes 30, fixed to the inner surface of base plate 18, communicate between the open end of straight portion 22b of glass tube 22 and the open end of straight portion 24a of glass tube 24, between the open end of straight portion 24b of glass tube 24 and the open end of straight portion 26a of glass tube 26, and between the open end of straight portion 26b of glass tube 26 and the open end of straight portion 28a of glass tube 28, respectively. Accordingly, these connecting tubes 30 and glass tubes 22, 24, 26 and 28, define discharge channel 32 which extends from the open end of straight 22a of glass tube 22 to the open end of the straight portion 28b of glass tube 28.

Within discharge channel 32 are sealed certain amounts of mercury and inert gas for starting up the device. A pair of electrodes 34a and 34b are fixed to base plate 18 and electrically connected to operating circuit parts 20. While one end of electrode 34a is inserted into the open end of straight portion 22a of glass tube 22, one end of electrode 34b is inserted into the open end of straight portion 28b of glass tube 28.

According to the fluorescent lamp device with the above construction, fluorescent lamp 12 and its discharge channel 32 have two flat faces when taking a cross section. When the cross sectional area is the same, the fluorescent lamp with a flat cross section as in the above embodiment has a larger surface area compared with the one having a circular cross section. Thus its heat radiation area is also larger, which can reduce the temperature rise in the fluorescent lamp. Further, the large surface area of fluorescent lamp 12 allows for an increased application area of fluorescent substance, and therefore an increased luminous area, too. According to this embodiment, no covering globe is provided, leaving fluorescent lamp 12 exposed to the air, thereby enhancing its heat radiation and diffusion characteristics. Therefore, the thermal deterioration of the fluorescent substance can be kept at a minimum, and it is possible to reduce the heat transmission from fluorescent lamp 12 to electronic operating circuit parts 20.

Glass tubes 22 through 28 constituting fluorescent lamp 12 are arranged so that all their major axes X—X's in cross section are located on a circle. Therefore, glass tubes 22 through 28 form a cylinder as a whole, and the whole outer surface of the cylinder looks luminous, giving an even light intensity distribution.

In the above embodiment, since no globe is provided, glass tubes 22 through 28 must be grasped directly when base 16 is screwed into or taken off from a socket (not shown). In this case, some of these glass tubes will be subjected to the force shown by a double arrow mark in FIG. 2, which may cause some damage, such as cracks, to the end portions of the glass tubes located on gase plate 18. According to the above embodiment, however, the glass tubes are so arranged that their major axes in cross section may form an arc, and as a result have a high mechanical strength against such a force, eliminating the occurrence of any damage, including cracks in the end portions of the tubes.

Incidentally, in the above embodiment, a globe 36 covering fluorescent lamp 12 may be provided as shown by the two dots and dash line in FIG. 1. In this case, globe 36 is fixed to base plate 18 by an adhesive.

Figure 5:
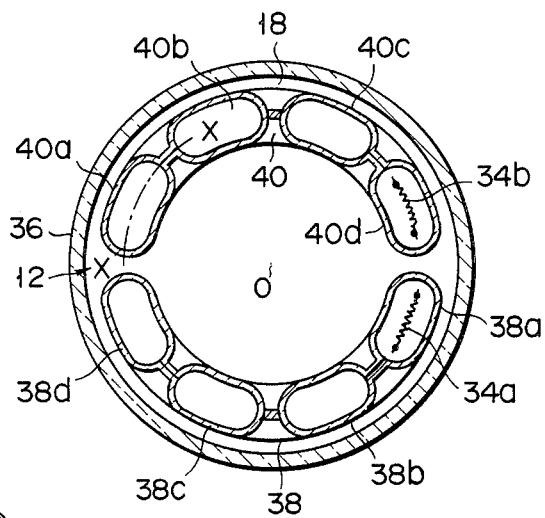
Figure 4:
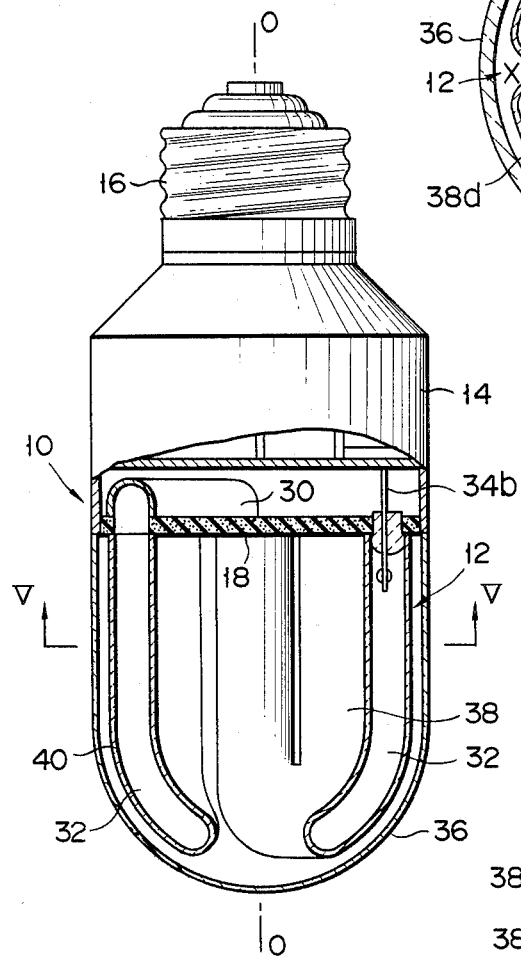
Figure 6:
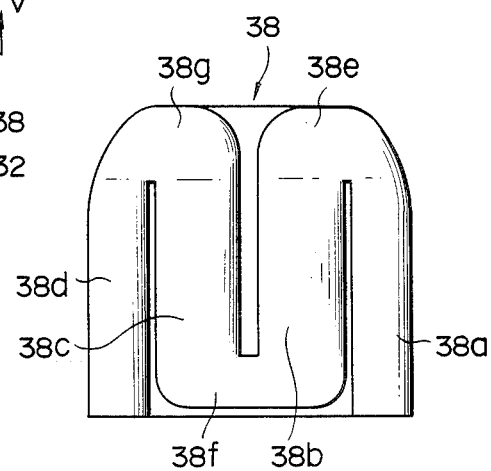

FIGS. 4 through 6 show a fluorescent lamp device according to a second embodiment of this invention. In this embodiment, fluorescent lamp 12 includes a pair of glass tubes 38 and 40 each of which is bent in a W-shape. Glass tube 38 has four straight portions 38a through 38d and three curved portions 38e, 38f and 38g connecting the straight portions with one another. The cross section of each straight portion is oval in shape and is formed so that its major axis X—X forms an arc, and these straight portions are connected with one another so that their major axes X—X's are located on a circle. Glass tube 40 is constructed in the same way as glass tube 38. Each of glass tubes 38 and 40, like the first embodiment, is molded in one step by pressing a heated glass tube between a pair of metal molds.

Glass tubes 38 and 40 are fixed to base plate 18, and extend therefrom along the central axis O—O of the fluorescent lamp device. Further, they are arranged so that their major axes X—X's in cross section are located on a circle coaxial with the central axis O—O of the device. As shown in FIG. 4, the extended end of each glass tube is curved toward the central axis O—O of the fluorescent lamp device.

Surrounding fluorescent lamp 12, globe 36, made of glass, light transmitting resin or the like is provided. It is fixed to base plate 18 by an adhesive.

In the fluorescent lamp device with the above construction, the same advantages as in the first embodiment can also be obtained. Further, since the extending ends of glass tube 38 and 40 are curved inwardly, a part of the luminous surface of lamp 12 faces downward, thereby increasing the downward brightness. The glass tube ends conform in shape to the end of globe 36, improving the accommodatability of fluorescent lamp 12 in the globe and resulting in a more compact lamp shape.

Figure 7:
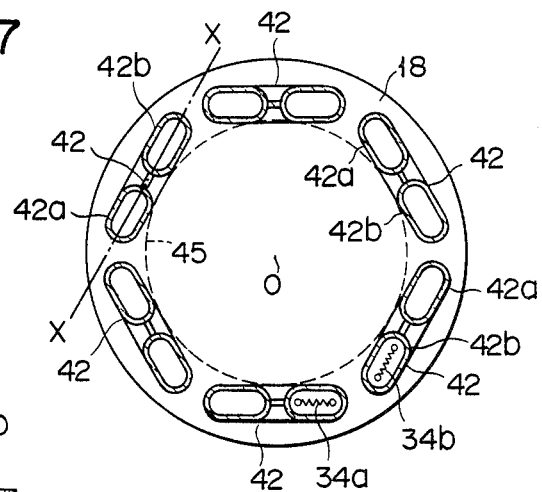
FIG. 7 is a sectional view of a fluorescent lamp device according to a third embodiment of this invention, corresponding to FIG. 2.
Figure 8:
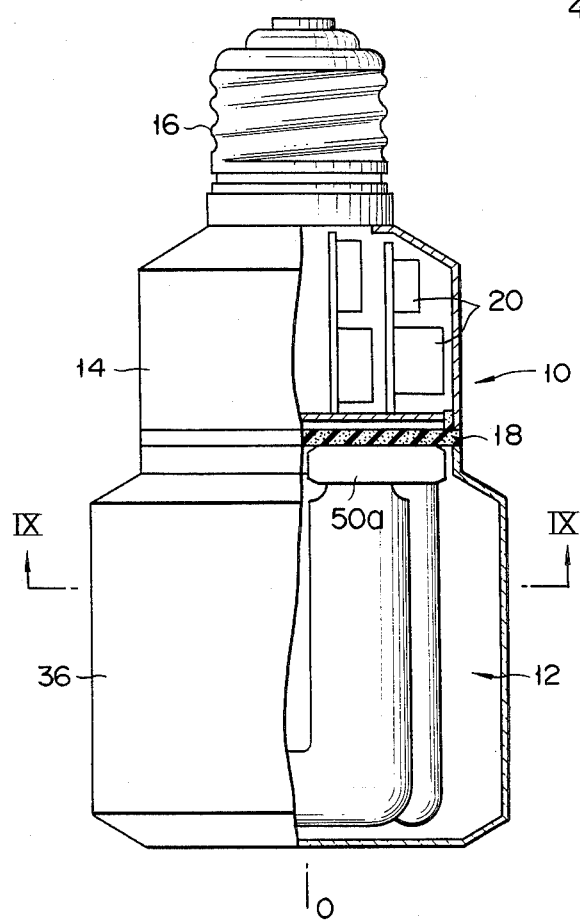
Figure 9:
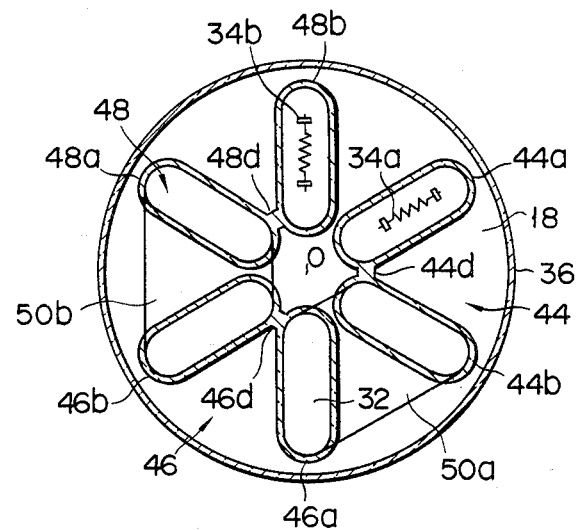
Figure 10:
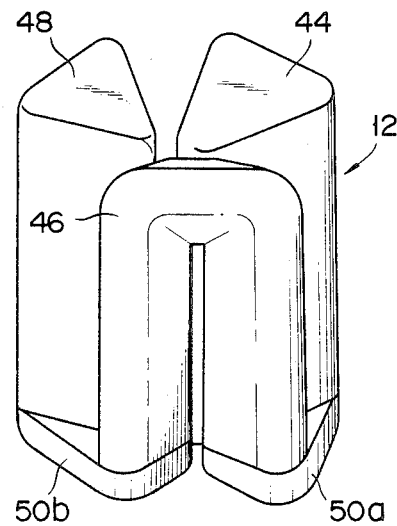
Figure 11:
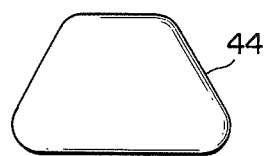
Figure 13:
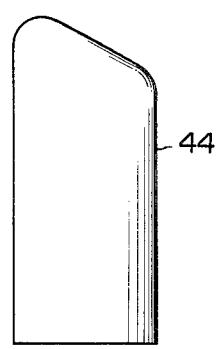
Figure 12:
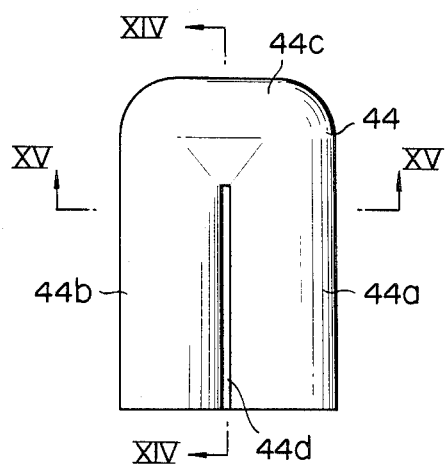
Figure 14:
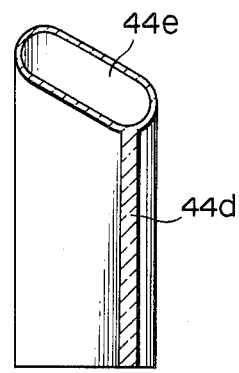
Figure 15:
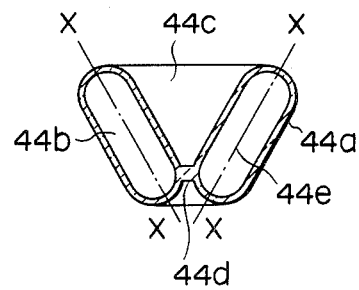

According to a third embodiment shown in FIG. 7, fluorescent lamp 12 includes six U-shaped glass tubes 42. Straight portions 42a and 42b of each glass tube 42 have an oval-shaped cross section with a straight major axis X—X, and are connected with each other so that their longitudinal axes in cross section are located on a straight line. Glass tubes 42 are fixed to base plate 18 tangentially along a circle 45 coaxial with the center O of the base plate, so that they may form a cylinder as a whole.

FIGS. 8 through 15 show a fourth embodiment of this invention. In this embodiment, fluorescent lamp 12 accommodated in globe 36 has three U-shaped glass tubes 44, 46 and 48, and these glass tubes are connected with one another by means of a pair of hollow connecting members 50a and 50b made of metal or glass, thus defining a zigzagging discharge channel 32.

Detailed explanation will be given about glass tube 44 as the example. As shown in FIGS. 11 through 15, glass tube 44 has a pair of straight portions 44a and 44b, and a curved portion 44c communicating between one ends of these straight portions. Discharge channel 44e defined by portions 44a, 44b and 44c has two substantially flat, faces which are parallel to the major axis for instance, an oval-shaped cross section. Straight portions 44a and 44b are formed such that their major axis X—X in cross section is straight, and they are coupled to each other by connecting portion 44d so that their major axes generally form a V-shape. The other glass tubes 46 and 48 are constructed in the same way as tube 44.

Connecting member 50a communicates between the open end of straight portion 44b of glass tube 44 and the open end of straight portion 46a of glass tube 46, and member 50b communicates between the open end of straight portion 46b of glass tube 46 and the open end of straight portion 48a of glass tube 48. As can clearly be seen from FIG. 9, these glass tubes are connected with one another so that the major axes X—X's of their straight portions extend radially. Fluorescent lamp 12 with such a construction is fixed to base plate 18 so that the major axes X—X's of the straight glass tube portions are located radially, relative to the center of base plate 18, i.e., the central axis O—O of the fluorescent lamp device.

In the fluorescent lamp device with the above construction, the temperature rise in fluorescent lamp 12 can be kept at a minimum and the luminous area can be increased as in the case of the first embodiment, since both cross sections of fluorescent lamp 12 and discharge channel 32 are given an oval shape. The glass tubes of fluorescent lamp 12 are arranged so that their X—X's in cross section extend radially from the central axis O—O of the fluorescent lamp device. Thus, each glass tube's two flat and wide sides along the major axis X—X face globe 36, thereby permitting these wider luminous surfaces of the glass tubes to be directed laterally and the lateral luminosity of the fluorescent lamp device is increased. By the same reasons, the heat generated in each glass tube can be radiated laterally, thereby improving the heat radiation characteristics of fluorescent lamp 12. This can further reduce the thermal deterioration of the fluorescent substance, as well.

This invention is not limited to the embodiments described above, but various changes and modifications may be made therefrom without departing from the scope of this invention.

For example, the cross section of the glass tubes is specified as oval in shape in the above embodiments and the cross section must be flat, but it may take such other forms as an elliptic shape, a rectangular shape or a crescent shape. Further, the number of glass tubes can be varied according the circumstances. The operating circuit may be mounted on the base plate so as to be located at the outside of the main body.

Further, this invention can be applied to a fluorescent lamp device which is not provided with an operating circuit. In this case, an operating circuit is located in the body of a lighting fixture to which the fluorescent lamp device is fitted.

What is claimed is:

1. A fluorescent lamp device comprising:
   a main body including a base, said main body having a central axis therethrough;
   a fluorescent lamp supported by said main body and eletrically connected to said base, said fluorescent lamp including a plurality of glass tubes having;
   a plurality of straight portions,
   at least one curved portion which communicates between said straight portions,
   two substantially flat faces which are parallel to a major cross sectional axis of said straight portions of said glass tubes,
   said plurality of glass tubes being fixed to said main body at an end of said straight portions;
   said plurality of glass tubes being arranged so that side edge faces of said straight portions of different glass tubes, which are perpendicular to said major cross sectional axes, along with each other and said glass tubes being further arranged so that said plurality of straight portions constitute a substantially cylindrical wall coaxial with said central axis of said main body;
   connecting members connecting said plurality of glass tubes with one another, thereby defining a zigzagging discharge channel.

2. A fluorescent lamp device according to claim 1, wherein each of said glass tubes includes at least one connecting wall for coupling said straight portions with one another and is formed by pressing a glass tube.

3. A fluorescent lamp device according to claim 1, wherein each of said glass tubes is formed substantially in a U-shape, and includes a pair of straight portions and a curved portion communicating between ends of the straight portions.

4. A fluorescent lamp device according to claim 3, wherein each of said straight portions has two substantially flat faces which are parallel with the major cross sectional axis of said straight portion and said pair of straight portions of each of glass tube are coupled to each other so that their major cross sectional axes are located on a circle; and said glass tubes are fixed to the main body so that the major cross sectional axes of their straight portions are located on a circle coaxial with the central axis of the main body.

5. A fluorescent lamp device according to claim 1, wherein each of said glass tubes is formed substantially in a W-shape and has four straight portions.

6. A fluorescent lamp device according to claim 5, wherein each of said straight portions has two substantially flat faces which are parallel with the major cross sectional axis of said straight portions and said four straight portions of each glass tube are coupled to one another so that their major cross sectional axes are located on a circle; and said glass tubes are fixed to the main body so that the major cross sectional axes of their straight portions are located on a circle coaxial with the central axis of the main body.

7. A fluorescent lamp device according to claim 1, which further comprises operating means, electrically connected to the fluorescent lamp and base, for operating the fluorescent lamp.

8. A fluorescent lamp device according to claim 7, wherein said operating means is disposed in the main body.

9. A fluorescent lamp device comprising: a main body including a base, said main body having a central axis therewith;
- a fluorescent lamp supported by said main body and electrically connected to said base, said fluorescent lamp including a plurality of glass tubes having:
  - a pair of straight portions,
  - a curved portion which communicates between said straight portions,
  - two substantially flat faces which are parallel with a major cross sectional axis of said straight portions of said glass tubes,
  - said straight portions of each glass tube being arranged so that their said major cross sectional axes form a V-shape,
- said plurality of glass tubes being fixed to said main body at an end of said straight portions;
- said plurality of glass tubes being arranged so that said major cross sectional axes of said straight portions of each glass tube extend radially from said central axis of said main body;
- connecting members connecting said glass tubes with one another, thereby defining a zigzagging discharge channel.

10. A fluorescent lamp device comprising:
- a main body including a base, said main body having a central axis therewith;
- a fluorescent lamp supported by said main body and electrically connected to said base, said fluorescent lamp including a plurality of a glass tubes having:
  - a plurality of straight portions,
  - at least one curved portion which communicates between said straight portions,
  - two substantially flat faces which are parallel with a major cross sectional axis of said straight portions of said glass tubes,
- said plurality of glass tubes being arranged so that side edge faces of said straight portions of different glass tubes, which are perpendicular to said major cross sectional axes, align with each other and said glass tubes being further arranged so that said plurality of straight portions constitute a substantially cylindrical wall coaxial with said central axis of said main body;
- said plurality of glass tubes being further arranged so that said curved portions of said plurality of glass tubes are curved toward said central axis of said main body;
- connecting members connecting said glass tubes with one another, thereby defining a zigzagging discharge channel.

* * * * *